June 9, 1959  J. W. WILLIAMSON  2,889,862
ROTARY CHOPPER TYPE HAY BREAKER ASSEMBLY
Filed Oct. 17, 1955  4 Sheets-Sheet 2
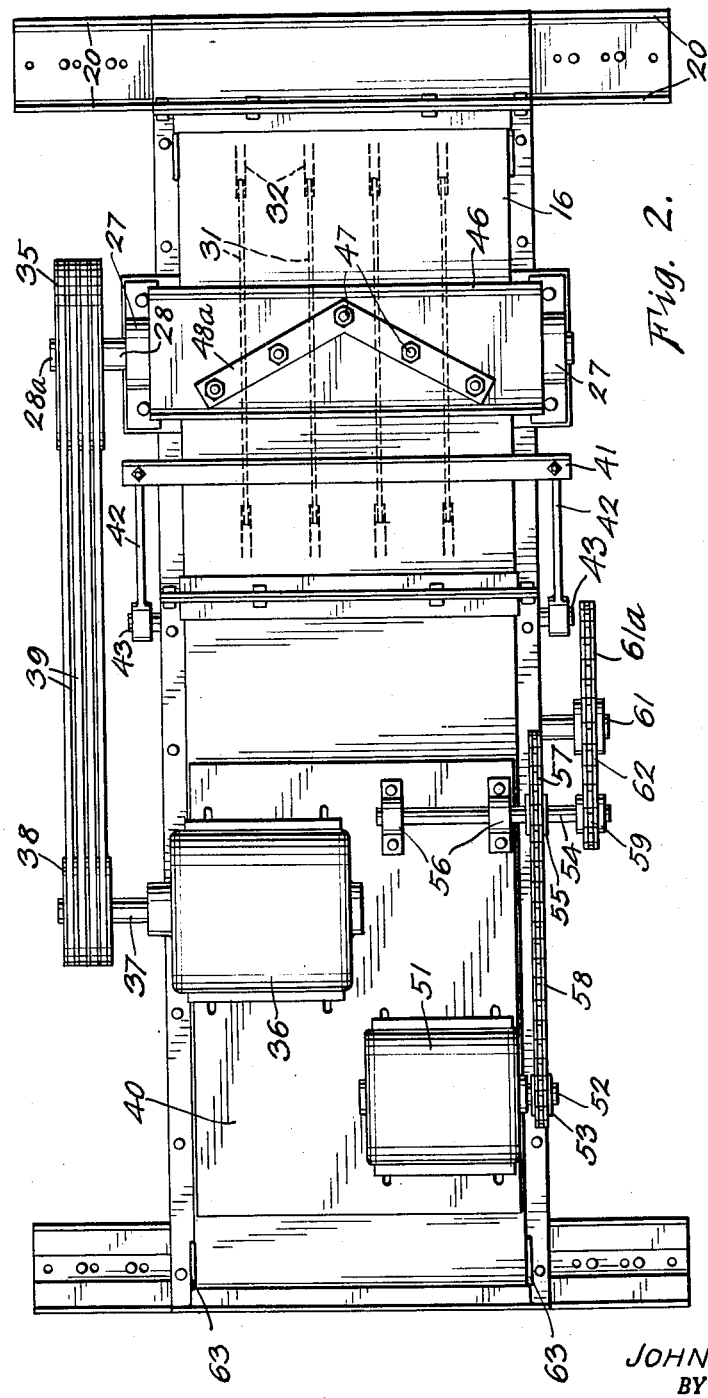
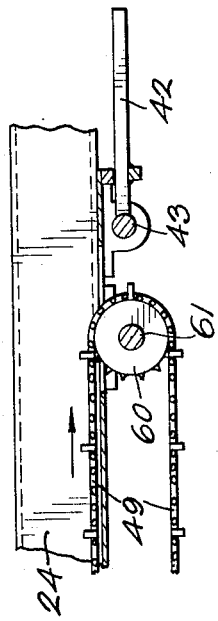
INVENTOR.
JOHN W. WILLIAMSON
BY
McGrew & Edwards
ATTORNEYS

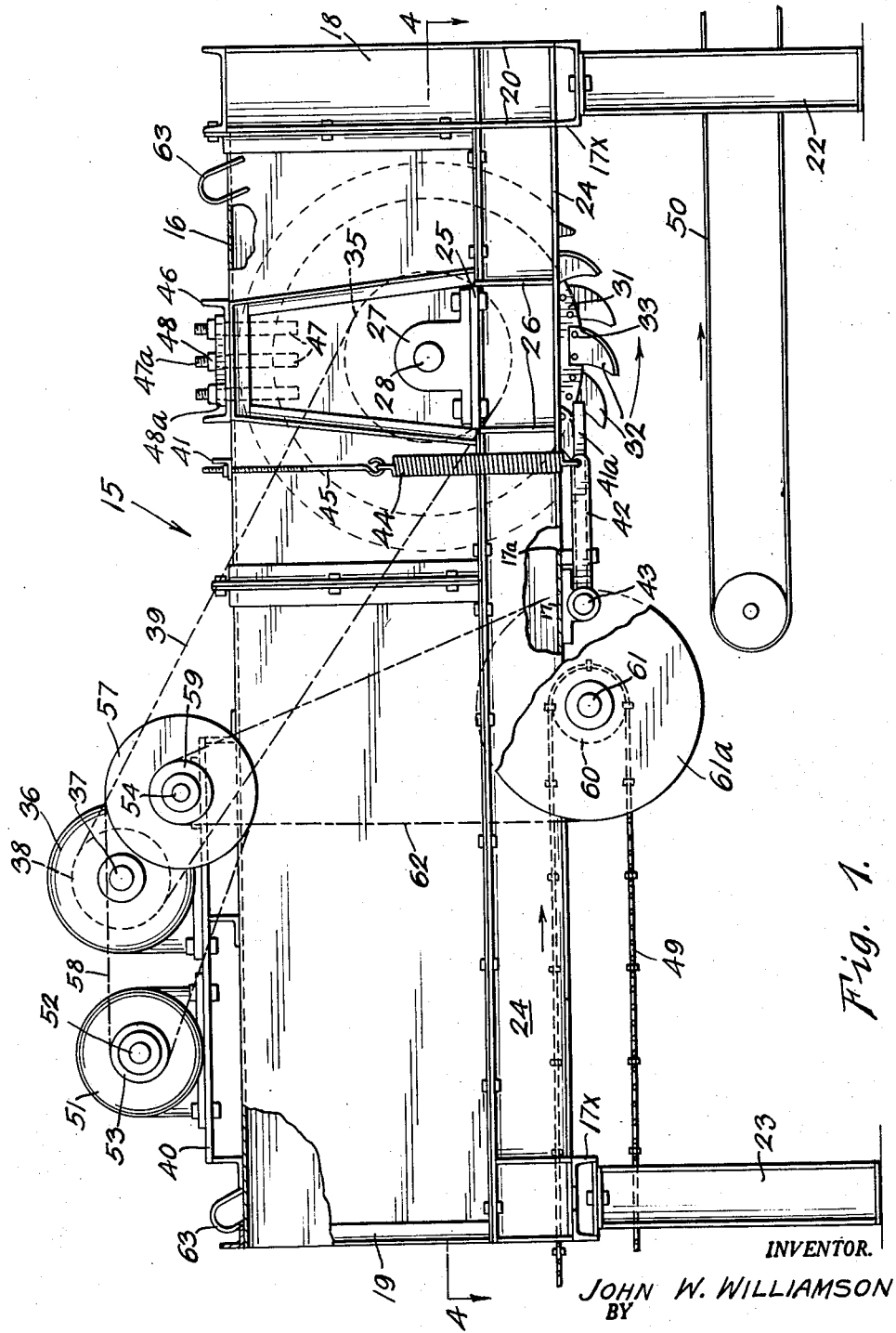

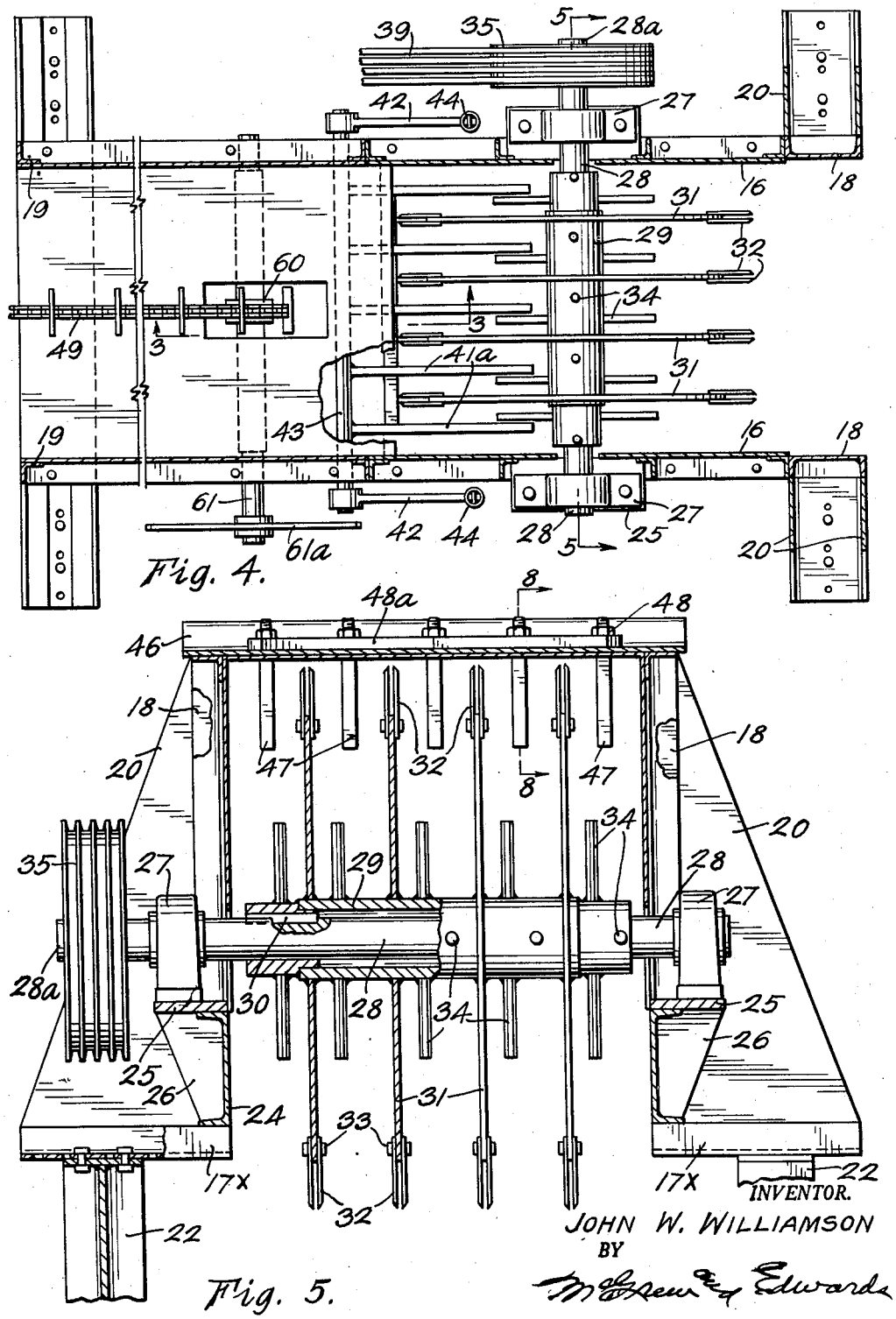

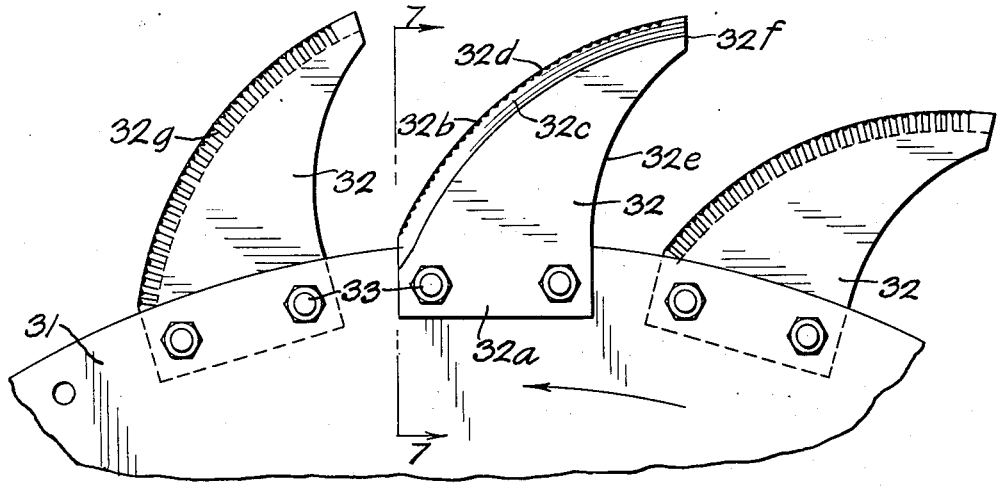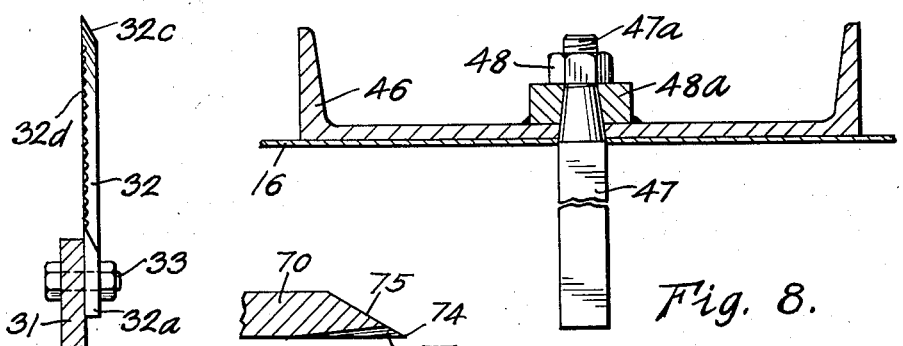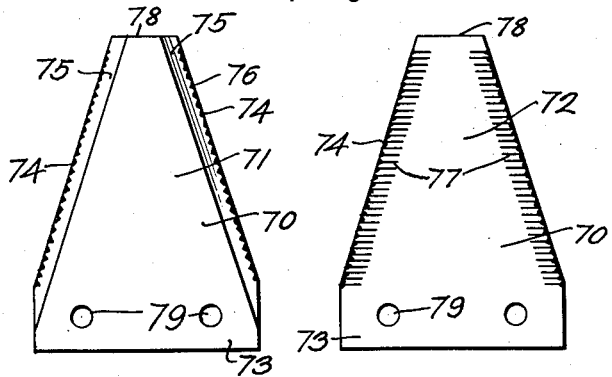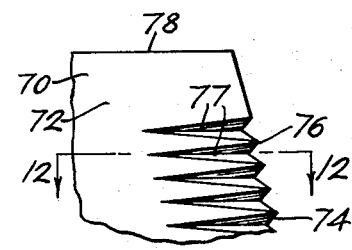

United States Patent Office 2,889,862
Patented June 9, 1959

2,889,862

ROTARY CHOPPER TYPE HAY BREAKER ASSEMBLY

John W. Williamson, Whittier, Calif.

Application October 17, 1955, Serial No. 541,011

6 Claims. (Cl. 146—119)

My present invention relates to a rotary chopper type hay breaker assembly. It has to do particularly, although not exclusively, with new and improved apparatus for subdividing compressed forage such, for example, as baled hay prior to feeding the same into a comminuting machine such, for example, as a hammer mill like that disclosed and claimed in my Patent No. 2,505,023. Moreover, the present invention is an improvement upon the invention disclosed and claimed in my Patent No. 2,549,876 issued April 24, 1951.

It is generally known that in the handling and treatment of forage, such as hay, it is frequently desirable to be able to cut and gather, and then store the forage in a convenient location until it is utilized as stock feed. The comminuted or finely divided hay provides an excellent feed for sheep and other animals. Because of weather conditions it frequently becomes necessary to gather the hay from the field on short notice and in a relatively short period of time, such period often being insufficient for subjecting the hay to a complete comminuting process. Moreover, it is necessary, in many cases, to transport the hay a considerable distance to get it to a remote point where the animals are to be fed. Therefore, to facilitate transporting and handling, it becomes desirable to compress the hay into bales which occupy much less space than is required for loose hay and consequently it can be transported and stored for later use more easily and efficiently.

As set forth in my Patent No. 2,549,876 bales of hay, and more generally, compressed forage, fed into a hammer mill, have a tendency to block or clog, and sometimes even stop. Even hay cut from a stack, without being torn apart, has the same tendency. While I shall describe below my present apparatus in connection with the subdividing of baled hay, it should be understood that it is applicable to similar treatment of other compressed forage, for example, hay from a stack.

It is one of the objects of my present invention to provide new and novel apparatus which may be set up with ease and facility for subdividing compressed forage such, for example, as baled hay, at a high output rate.

Another object of my invention is to provide a rotary chopper type hay breaker assembly having new and improved means for holding and shredding those parts or portions of the compressed forage which were not cut by the slicing knives or separated by the beating studs or elements of the hay breaker assembly, thus producing a superior product for feeding into a hammer mill, or the like apparatus.

A further object of my invention is to provide a hay breaker assembly as aforesaid having improved safety means for preventing extraneous matter mixed in with the hay from reaching and thus damaging the slicing knives of the assembly.

Another object is to provide new and improved apparatus as described above which is of relatively simple construction, relatively low in cost, efficient in operation, and which has a high output factor.

The foregoing and other objects and advantages of my present invention will be apparent from the following description and appended claims when considered in conjunction with the accompanying drawings forming a part of this specification wherein like reference characters designate corresponding parts in the several views.

In said drawings:

Fig. 1 is a side elevational view, partly broken away, of the cutting or slicing and beating section or portion of the hay breaker assembly or apparatus of the present invention;

Fig. 2 is a top plan view of the structure seen in Fig. 1;

Fig. 3 is a fragmentary longitudinal sectional view taken substantially along the line 3—3 of Fig. 4, looking in the direction of the arrows;

Fig. 4 is a horizontal longitudinal sectional view, broken to indicate greater length, taken substantially along the line 4—4 of Fig. 1, looking in the direction of the arrows;

Fig. 5 is an enlarged vertical transverse sectional view taken substantially along the line 5—5 of Fig. 4, looking in the direction of the arrows;

Fig. 6 is an enlarged fragmentary side elevation of one of the rotatable knife-carrying disks, showing the relationship and details of three of the peripherally disposed cutting or slicing knives;

Fig. 7 is a fragmentary vertical sectional elevation of one of the knives, being taken substantially along the line 7—7 of Fig. 6, looking in the direction of the arrows;

Fig. 8 is an enlarged vertical sectional view, partly in elevation, of one of the hay holding and shredding fingers or members of the assembly, the finger being broken away to indicate greater length;

Fig. 9 is an elevational view of one side or face of a modified cutting or slicing knife embodying my invention;

Fig. 10 is a similar view showing the opposite side or face of the knife or cutter of Fig. 10;

Fig. 11 is an enlarged fragmentary detail, in elevation, of the upper right hand corner of the knife or blade of Fig. 10, showing the details of the teeth in one cutting edge thereof; and Fig. 12 is a fragmentary horizontal detail sectional view of the knife portion of Fig. 11, taken substantially along the line 12—12 of Fig. 11, looking in the direction of the arrows.

Before explaining in detail the present invention, it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

The rotary so-called chopper type hay breaker assembly of the present invention, including conveyer means for feeding hay, baled or in cut-from-stack form, or some other compressed forage, to the cutter and beater section, and the conveyer means for moving the hay from the section to a comminuter, such as a hammer mill (not shown) are or may be generally like such conveyer means disclosed in my above-mentioned Patent No. 2,549,876. The particular structure of these conveyers need not be of concern so long as they serve their proper and intended delivery and removal functions in a manner which presents the hay to the cutting or slicing knives in a predetermined path and position and then conveys the cut or sliced, beaten and shredded hay away from the assembly to a comminuter for treatment therein.

The cutter and beater section of my apparatus is shown as a whole at 15 in Fig. 1. The operating parts are enclosed within a housing having a top portion 16 and a bottom portion 17 which terminates at 17a (Fig. 1) to provide a discharge passage. The right end of the housing as viewed in Fig. 1 is supported by upright channels 18, 18 reinforced by gussets 20, 20, these being connected to structural base members which may be I-beams 22, 22. The left end of the housing is supported by upright angle members 19, 19 connected to and mounted upon structural base members or supports 23, 23. At each side of the housing extending longitudinally thereof is a channel member 24 supported on base member 17x, see Fig. 5. A small platform 25 is mounted at one point on the edgewise channel 24 and is held in place by brace plates or gussets 26, 26, see Figs. 1 and 5. A journal bearing 27 is mounted on each platform 25 and these two spaced bearings, see Fig. 5, support a transverse shaft 28. Shaft 28 carries a sleeve or tube 29 telescoped over it which is keyed to the shaft by a key 30.

At spaced intervals on sleeve 29 are mounted a series of disks or so-called slicing saws 31 which carry at their peripheral portions a series of cutter knives, or slicers 32 held in place by bolts or screws 33. Fig. 6 shows the spacing of these slicers 32 and also shows that alternates ones are disposed on opposite sides of the disks 31. These members 32 will be described in detail below.

Shaft 28 is extended at one side at 28a and carries a pulley 35. An electric motor 36 is mounted upon a platform 40 on casing top 16. Its shaft 37 carries a pulley 38 which is drivingly connected with pulley 35 by drive belts or chains 39, see Fig. 2.

A safety device in the form of a spring-tensioned lattice or movable grizzly is arranged adjacent to and just forwardly of the disks 31 and slicers 32, see Figs. 1, 2 and 4. The purpose is to allow the discharge of any heavy, hard, extraneous matter carried by the forage before reaching knives 32, thus preventing damage to those parts of the apparatus. The grizzly, as shown, comprises a transverse angle bar 41 mounted on a pair of arms 42, see Fig. 2, which arms are swingably mounted on the ends of a shaft 43. Shaft 43 also carries a series of spaced forwardly extending normally horizontal arms 41a. Tension coil springs 44, 44 are attached to arms 42, 42. The upper ends of the springs are attached to adjustable rods 45, 45 mounted in and depending from top member 16, as best seen in Fig. 1.

The top member 16 carries a channel member 46 which is suitably apertured to admit a plurality of depending fingers 47 having upper threaded ends 47a for cooperation with nuts 48 which hold fingers 47 in a depending position on a fixed block 48a arranged in the form of a V, as shown in Fig. 2, to position adjoining fingers out of transverse alinement with their lower ends substantially below the upper range of knife rotation. The fingers preferably are of square cross section, see Fig. 8. These rigid fingers 47 project or extend into the spaces between the upper peripheral portions of cutter-carrying disks 31 as best seen in Fig. 5. Their purpose is to hold and shred those parts or portions of the forage (compressed hay) which were not sliced by knives 32 or beaten down by the rotating beating arms or studs 34 which are mounted on and extend radially from sleeve 29, see also Fig. 5. The arrangement of the knives 32, beating arms 34 and rigid fingers 47 prevents packing of the forage between the rotating knives permitting it to fall freely through the bottom opening of the housing enclosure.

A suitable endless conveyer 49 is provided for feeding the compressed forage to the knives 32 and another endless conveyer 50 is provided for removing the subdivided fragments of the forage from the cutter and beater section 15. Means are provided for driving both conveyers although I have not shown any such for the conventional discharge conveyer 50.

Conveyer 49 has sprockets, chains and shafting which are powered by an electric motor 51. Motor 51 is mounted upon platform 40 and has a motor shaft extension 52, see Fig. 2. Shaft 52 carries a sprocket or pulley 53 which is drivingly connected to a countershaft 54 having a hub 55 and being mounted in journal bearings 56, 56 attached to platform 40, through the medium of a sprocket 57 on hub 55 and a chain 58.

Shaft 54 carries a second and smaller sprocket 59 which is drivingly connected to a sprocket 60 on conveyer shaft 61, by a drive chain 62, see Figs. 1, 2 and 3.

Referring now to Figs. 6 and 7, one form of cutter, slicer or knife 32 of my invention, is shown. Knife 32 includes a body having a base portion 32a, a front or leading edge 32b, a front face bevel 32c, serrations 32d, a following curved edge 32e and a flat, straight tip or outer end portion 32f which interconnects curved edges 32b and 32e. The back or rear face of knife 32 has a series of cut V-shaped grooves 32g which extend a short distance on the knife body from the serrations 32d, and diminish in depth from the serrations as they extend inwardly of the back face. The blade or slicer 32 is held to the peripheral portion of disk 31 by bolt and nut assemblies 33.

A modified form of slicer, or the like, embodying the present invention is shown as a whole at 70 in Figs. 9, 10, 11 and 12. It has a body having a front face 71, a back face 72 and a base portion 73. The side edges 74, 74 converge, as shown, and are interconnected by a flat and straight tip portion or outer end 78. The edges on the front face are bevelled at 75, 75 and terminate in serrations 76, 76, see Fig. 9. The back face 72 at the side edges 74, 74 is provided with a series of V-shaped grooves 77 which extend inwardly a short distance toward one another from the side edges and the serrations 76, 76. These grooves diminish in depth from the serrations as they extend inward from the serrations, see especially Figs. 11 and 12.

Normally the disks 31 rotate in a counter-clockwise direction, as indicated by the arrow in Fig. 6.

The disks may be rotated in either direction if and when the slicers or knives 70 are used, this for the reason that both side edges 74, 74 of the knife are identical. Holes 79 are provided in base portion 73 of the knife to permit its attachment to a peripheral portion of one of the disks 31.

I claim:

1. A hay breaker comprising an elongated rectangular enclosure having sides and a substantially straight top and bottom through which enclosure compressed hay is moved along a substantially horizontal course, said bottom having an opening adjacent an end of the course, a rotary shaft mounted horizontally in the enclosure above said opening, means operatively associated with the shaft for rotating said shaft, a plurality of spaced disks fixedly mounted on said shaft, each disk having a series of slicing knives distributed about its periphery and extending therebeyond so as to rotate within an area extending from substantially the top of said enclosures to an elevation substantially below said opening in said bottom, and a plurality of rigid finger members mounted on and depending from the top portion of the enclosure above said bottom opening and above the rotary shaft between adjoining disks and between the disks and the sides of said enclosure so as to shred bunches of hay rotating with said knives in either direction of rotation and to direct the shredded hay in a gravitational fall through said opening.

2. A hay breaker as defined in claim 1, in which at least some of the finger members are mounted in longitudinally spaced relation in the direction of feeding.

3. A hay breaker as defined in claim 1, in which the finger members are mounted in rows and the rows are disposed at an acute angle to said horizontal shaft.

4. A hay breaker as defined in claim 1, in which radial arms are mounted on said shaft and between adjoining knives for rotation with said shaft.

5. A hay breaker as defined in claim 1, in which horizontally extending arms are disposed in said bottom opening between adjoining knives.

6. A hay breaker as defined in claim 1, in which a spring-mounted grizzly extends closely adjacent said bottom opening and having at least a bar thereof positioned in the space between adjoining knives.

References Cited in the file of this patent

UNITED STATES PATENTS

| | | |
|---|---|---|
| 75,990 | Sheldons | Mar. 24, 1869 |
| 692,601 | Berger | Feb. 4, 1902 |
| 922,058 | Squair | May 18, 1909 |
| 1,844,279 | Gossard | Feb. 9, 1932 |
| 2,148,547 | Fiese et al. | Feb. 28, 1939 |
| 2,152,791 | Dahlstrom et al. | Apr. 4, 1939 |
| 2,549,876 | Williamson | Apr. 24, 1951 |
| 2,635,663 | Schmidt | Apr. 21, 1953 |
| 2,681,090 | Hicks et al. | June 15, 1954 |